United States Patent [19]
Tajima

[11] Patent Number: 5,535,001
[45] Date of Patent: Jul. 9, 1996

[54] SYMMETRIC MACH-ZEHNDER ALL-OPTICAL DEVICE

[75] Inventor: Kazuhito Tajima, Tokyo, Japan

[73] Assignee: NEC Corporation, Japan

[21] Appl. No.: 269,575

[22] Filed: Jul. 1, 1994

[30] Foreign Application Priority Data

Jul. 2, 1993 [JP] Japan ................................ 5-164455

[51] Int. Cl.⁶ ................................................ G01B 9/02
[52] U.S. Cl. ............................................ 356/345; 385/12
[58] Field of Search ............................. 385/1–3, 122, 385/12, 141, 13; 356/345

[56] References Cited

U.S. PATENT DOCUMENTS 5,347,608  9/1994  Nakamura et al. ................ 385/122

OTHER PUBLICATIONS

An Ultrafast All–Optical Gate; IEEE Journal of Quantum Electronics, vol. QE–19, No. 11, Nov. 1983; Annalisa Lattes, et al.

Laser Applications and Other Topics in Quantum Electronics, Optical–signal controlled logic elements for computers; Sov. J. Quantum Electron. 21(11) Nov. 1991, pp. 1260–1264; V. P. Torchigin, et al.

All–Optical Switch with Switch–Off Time Unrestricted by Carrier Lifetime; Jpn. J. Appl. Phys. vol. 32 (1993) pp. L1746–L1749 Part 2, No. 12A, 1 Dec. 1993; Kazuhito Tajima.

High-speed all-optical switching experiment in Mach-Zehnder configuration using GaAs waveguide; Appl. Phys. Lett. 62 (9), 1 Mar. 1993, pp. 925–927; S. Nakamura, et al.

European Patent Office Abstract; Publication No. JP127623; Publication Date: May 16, 1990; Inventor: Tajima Kazuto; Title: Optical Element.

European Patent Office Abstract; Publication No. JP1201627; Publication Date: Aug. 14, 1989; Inventor: Shimizu Makoto; Title: Waveguide Type Optical Switch.

*Primary Examiner*—Frank Gonzalez
*Assistant Examiner*—Robert Kim
*Attorney, Agent, or Firm*—Ostrolenk, Faber, Gerb & Soffen

[57] ABSTRACT

The Mach-Zehnder type all-optical device for controlling a signal light with a control light, includes two arms for constituting a Mach-Zehnder configuration, each of the arms being constituted at least partially of material having third order optical nonlinearity, and an introducer of a control light to a portion of each of the arms revealing the optical nonlinearity.

12 Claims, 9 Drawing Sheets

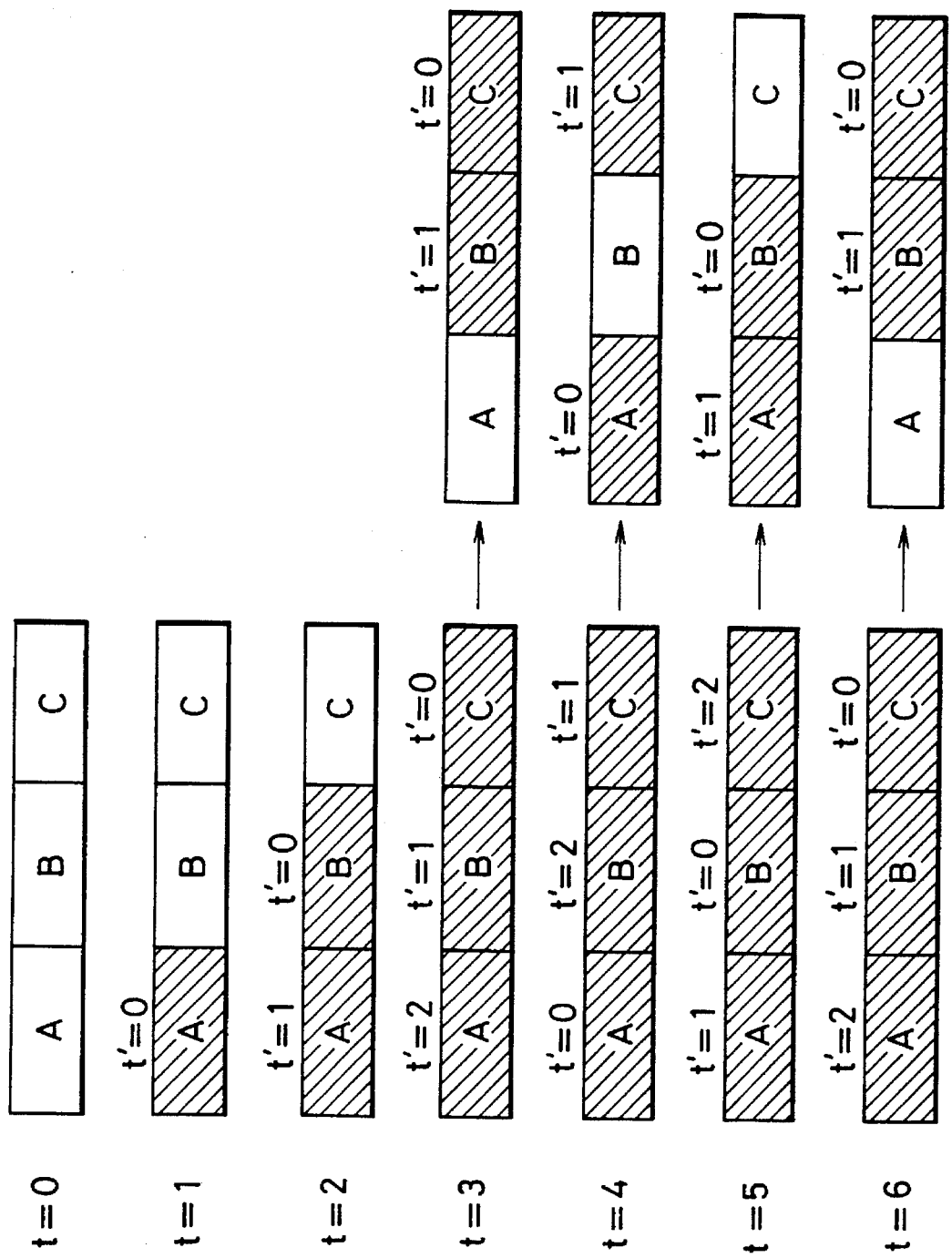

SYMMETRIC MACH-ZEHNDER ALL-OPTICAL DEVICE

BACKGROUND OF THE INVENTION

1. Field of the Invention

The invention relates to an all-optical device for directly controlling a light with a light, and more particularly to an ultra-high speed all-optical device used as an optical control device in optical fiber communication and optical data processing.

2. Description of the Related Art

It is absolutely necessary to drive a device for accomplishing optical control at higher speed in order to operate an optical fiber communication system or data processing system at higher speed. In a conventional optical control device, the optical control has been carried out with electrical signals. However, in these days, attention is attracted to a process in which a light is directly controlled with a light, in order to carry out higher speed operation. This process has many advantages including that the operation speed thereof is not restricted by a CR time constant of an electrical circuit, and that optical pulses by which it is possible to generate pulses quite shorter than electrical pulses are directly available. However, many unsolved problems have to be overcome in order to establish such an all-optical device. In particular, many requirements have to be satisfied simultaneously for establishing such an all-optical device. The many requirements include functions of the device, low power operation, high transmittance of a signal light, and high repetition operation. It is preferred for the functions of the device to include that a route of a signal light can be switched by a control light, and also that such devices can be cascaded. Devices which satisfy these requirements include a Mach-Zehnder type waveguide device and a directional coupler type waveguide device. Among these two devices, a Mach-Zehnder type waveguide device is considered to be superior to a directional coupler type waveguide device because the former needs only half the optical power of the latter for operation.

Whatever form an all-optical device may have, the operation of an all-optical device is based on nonlinear refractive index change. In other words, the speed and energy for operation of an all-optical device is dependent on the speed and/or efficiency of nonlinear refractive index change. There are various nonlinear optical phenomena which accompany nonlinear refractive index change. Such phenomena can be grouped into two groups, one of which is resonantly enhanced phenomena and the other is not. Even in the present stage, if the nonresonant effects are utilized, an all-optical device could perform ultra-high repetition operation at more than T Hz. However, such an all-optical device has the disadvantage that it requires a high optical power. Accordingly, it is necessary to reduce an optical intensity by resonantly enhanced effects. The resonantly enhanced effects can be grouped into coherent effects and others.

For accomplishing an ultra-fast response, the coherent effects are preferred in which a response time is not restricted by a longitudinal relaxation time of an electronic system. Here, the coherent effects are those in which correlations in phase are maintained between electronic wave functions and optical fields throughout interaction of a light with a material. In order to achieve a coherent interaction, it is necessary that the optical pulse width be shorter than the phase relaxation time of the material in which the interaction takes place. In the case of room temperature bulk GaAs, the phase relaxation time is approximately in the range of 0.1 to 0.2 ps. When the optical pulse width is longer than the phase relaxation time, real carrier generation occurs. The operation speed is restricted by slow longitudinal relaxation due to the real carrier generation, and in addition thereto, the coherent effects are prevented to reveal. It has been shown that even when the optical pulse width is shorter than the phase relaxation time, the real carrier generation still occurs via the two-photon absorption process. The higher a pulse repetition frequency, the greater is the accumulation of real carrier generation. Accordingly, though ultra high speed phenomena can be observed with ultra-short pulses in the femto-seconds order, generated by a mode-locked laser, and having a repetition rate of approximately 100 MHz, it is expected that the ultra high speed phenomena cannot be observed due to influences of the real carrier generation as the repetition frequency increases. The above mentioned 100 MHz is a frequency slower than carrier lifetime. For the aforementioned reasons, at the present stage, it is considered to be impossible to establish an all-optical device which is capable of ultra-high repetition operation utilizing resonantly enhanced coherent effects such as AC-Stark effect.

On the other hand, resonantly enhanced incoherent effects caused by real carrier generation is considered to be able to operate at low power smaller than watt, and hence is quite practical. However, switch-off time of a device or relaxation time of nonlinear refractive index is restricted by longitudinal relaxation time or interband recombination time of a carrier. In the case of GaAs, the interband recombination time is on the order of nanoseconds, and thus it is impossible to utilize the high speed of a light.

Accordingly, it is desired to shorten relaxation time of resonant incoherent effects such as band-filling effect by any means. There can be considered several processes for increasing a speed of relaxation time of band-filling effect. One of them is to introduce recombination centers via proton bombardment, but may entail reduction of nonlinearity. The increase in speed of relaxation time due to surface levels is effective to a simple form such as etalon, but may entail doubts in compatibility with waveguide devices and also may have a limitation in increasing the operation speed. By any conventional processes such as above mentioned, it is impossible to achieve operation on the order of picoseconds for taking advantage of the high speed of a light, and in addition, conventional processes entail the reduction of nonlinearity.

SUMMARY OF THE INVENTION

It is an object of the present invention to provide an optical circuit capable of solving the problems as above mentioned with respect to the physical properties of nonlinear material, namely, a Mach-Zehnder type all-optical device switch-off time of which is not dependent on the longitudinal relaxation time of the nonlinear effects.

The invention provides a Mach-Zehnder type all-optical device for controlling a signal light with a control light, including two arms for constituting a Mach-Zehnder configuration, each of the arms being composed at least partially of material having third order optical nonlinearity, and a device for introducing a control light to a portion of each of the arms having optical nonlinearity.

The invention further provides a Mach-Zehnder type all-optical device for controlling a signal light with a control light, including two arms for constituting a Mach-Zehnder configuration, each of the arms being composed at least partially of material having absorption saturation characteristics and nonlinear refractive index change associated therewith, and a device for introducing a control light to a portion of each of the arms having optical nonlinearity.

In a preferred embodiment, the optical nonlinearity of the arms are approximately identical with each other.

In another preferred embodiment, the Mach-Zehnder type all-optical device further includes a device for splitting a control light into two beams and then introducing each beam to each of the portions having optical nonlinearity.

In still another preferred embodiment, each of the two beams is introduced to each of the portions with a time gap.

The present invention further provides a Nach-Zehnder type all-optical device for controlling a signal light with a control light, including two arms for constituting a Mach-Zehnder configuration, each of the arms being composed at a plurality of portions thereof of material having third order optical nonlinearity, and a device for independently introducing a control light to each of the plurality of portions.

The present invention further provides a Mach-Zehnder type all-optical device for controlling a signal light with a control light, including two arms for constituting a Mach-Zehnder configuration, each of the arms being composed at a plurality of portions thereof of material having absorption saturation characteristics and nonlinear refractive index change associated therewith, and a device for introducing a control light to each of the portions having optical nonlinearity.

The advantages obtained by the aforementioned present invention will be described hereinbelow.

By the Mach-Zehnder type all-optical device in accordance with the invention, it is now possible to provide an all-optical device which can achieve low power operation and ultra-high-speed switching without the switching speed being restricted by the relaxation time of the nonlinear material.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 9 is a conceptive view showing the operation of nonlinear waveguides constituted of nonlinear material.

DESCRIPTION OF THE PREFERRED EMBODIMENTS

Preferred embodiments in accordance with the invention will be explained hereinbelow with reference to drawings.

At first, hereinbelow is explained prior art for a better understanding the present invention.

Figure 1:
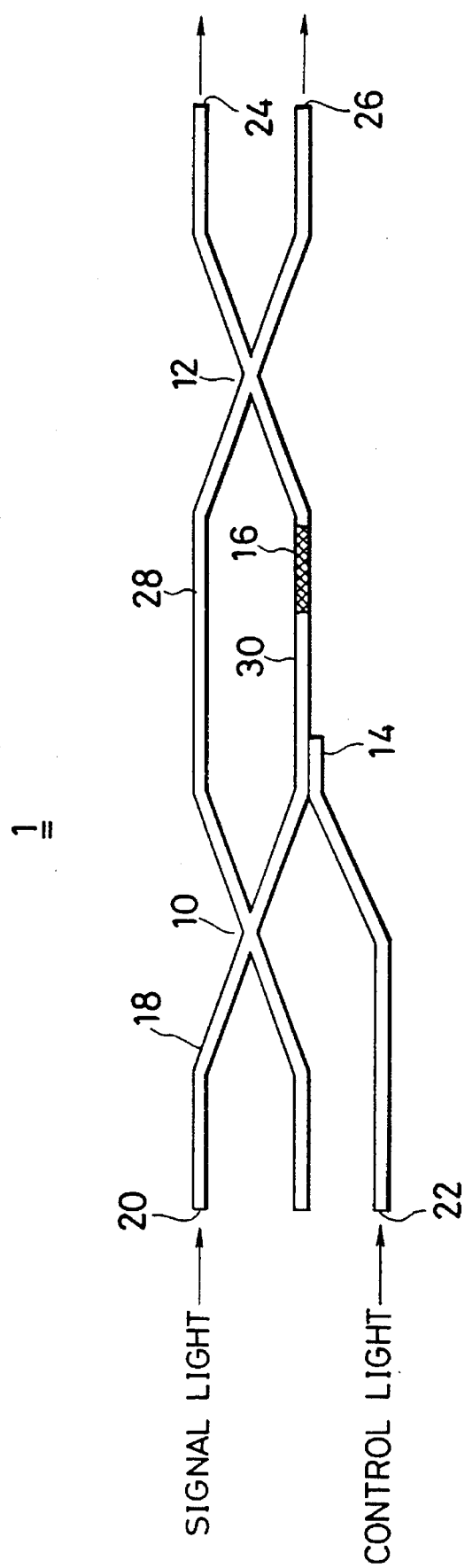
FIG. 1 is a schematic view illustrating a conventional Mach-Zehnder type all-optical device.

FIG. 1 illustrates a conventional Mach-Zehnder type all-optical device. As illustrated in FIG. 1, the Mach-Zehnder type all-optical switch 1 includes first and second 3dB couplers 10 and 12, a wavelength selective coupler 14, a nonlinear waveguide 16 made of nonlinear material, an input port 20 for introducing a signal light therethrough, an input port 22 for introducing a control light therethrough, a first output port 24, a second output port 26, and optical waveguide 18 for connecting the foregoing with one another. The first and second 3dB couplers 10 and 12, the wavelength selective coupler 14, the input and output ports 20, 22, 24 and 26 and the waveguide 18 are all composed of optical fibers, and the nonlinear waveguide 16 is one made of a semiconductor of the type of GaAs core/AlGaAs clad. It should be noted that all elements as aforementioned may be composed of semiconductor. A signal light is introduced into the all-optical switch 1 through the input port 20, and then split into two beams by the first 3dB coupler 10 to introduce each of first and second arms 28 and 30. The split signal lights transmitting through the first and second arms 28 and 30 interfere with each other in the second coupler 12 to thereby be joined together. Which port 24 or 26 the signal light interfered with and hence joined in the second coupler 12 transmits to depends on relative phase at the second coupler 12 between the split signal lights transmitting through the first and second arms 28 and 30. That is to say, when the optical lengths of the first and second arms 28 and 30 are equal to each other, the signal light joined together is again split to the first and second output ports 24 and 26. On the other hand, when the optical length of the first arm 28 is shorter than that of the second arm 30 by ¼-wavelength, the signal light joined together is all introduced to the first output port 24. To the contrary, when the optical length of the first arm 28 is longer than that of the second arm 30 by ¼-wavelength, the signal light joined together is all introduced to the second output port 26. Accordingly, it is possible to introduce the signal light introduced through the input port 20 to a desired output port 24 or 26 by varying the optical length of either of the first or second arm 28 or 30. The optical length is defined as a product of an actual propagated distance of a light and the refractive index. Thus, in a conventional Mach-Zehnder type all-optical device, nonlinear material is inserted into the second arm 30, and the refractive index of the nonlinear waveguide 16 in the second arm 30 and hence the optical length of the second arm 30 may be varied by optically exciting the nonlinear material.

Accordingly, an output port through which a signal light is to be transmitted can be switched by varying the refractive index of the nonlinear waveguide with a control light, and thereby it is possible to directly control a light with a light. As is known in the art, this is just the operation of an all-optical device. Since nonlinear material (GaAs) having an absorption edge of about 870 nm is transparent with respect to the wavelength of a signal light (900 nm), there is almost no loss in a signal light due to absorption. For the same reason, change due to a signal light in the refractive index of the nonlinear waveguide is negligible. This is because that the foregoing phenomenon is nonresonant in which the wavelength of a signal light is not resonant with the material, and hence a great change in the refractive index will not occur at the wavelength unless the signal light intensity is exceedingly high.

On the other hand, the wavelength (865 nm) of a control light introduced into the nonlinear waveguide 16 through the wavelength selective coupler 14 is shorter than that of an absorption edge of a core of the nonlinear waveguide passage 16, and hence the control light is absorbed by the nonlinear material (incoherent resonant excitation). As aforementioned, in resonant excitation, even low power excitation can cause a great change in the refractive index. In particular, as in the conventional device, it is possible to establish an all-optical device in which the nonlinearity is large, and the operation energy is small in the case of resonant absorption type nonlinear refractive index change. Thus, the resonant absorption type nonlinearity enables to achieve an all-optical device which can operate with low energy, but entails a problem that the operation speed is restricted by longitudinal relaxation time or carrier life time of excited photo carriers. Hereinbelow will be explained this situation with reference to FIGS. 1 and 2.

Figure 2:
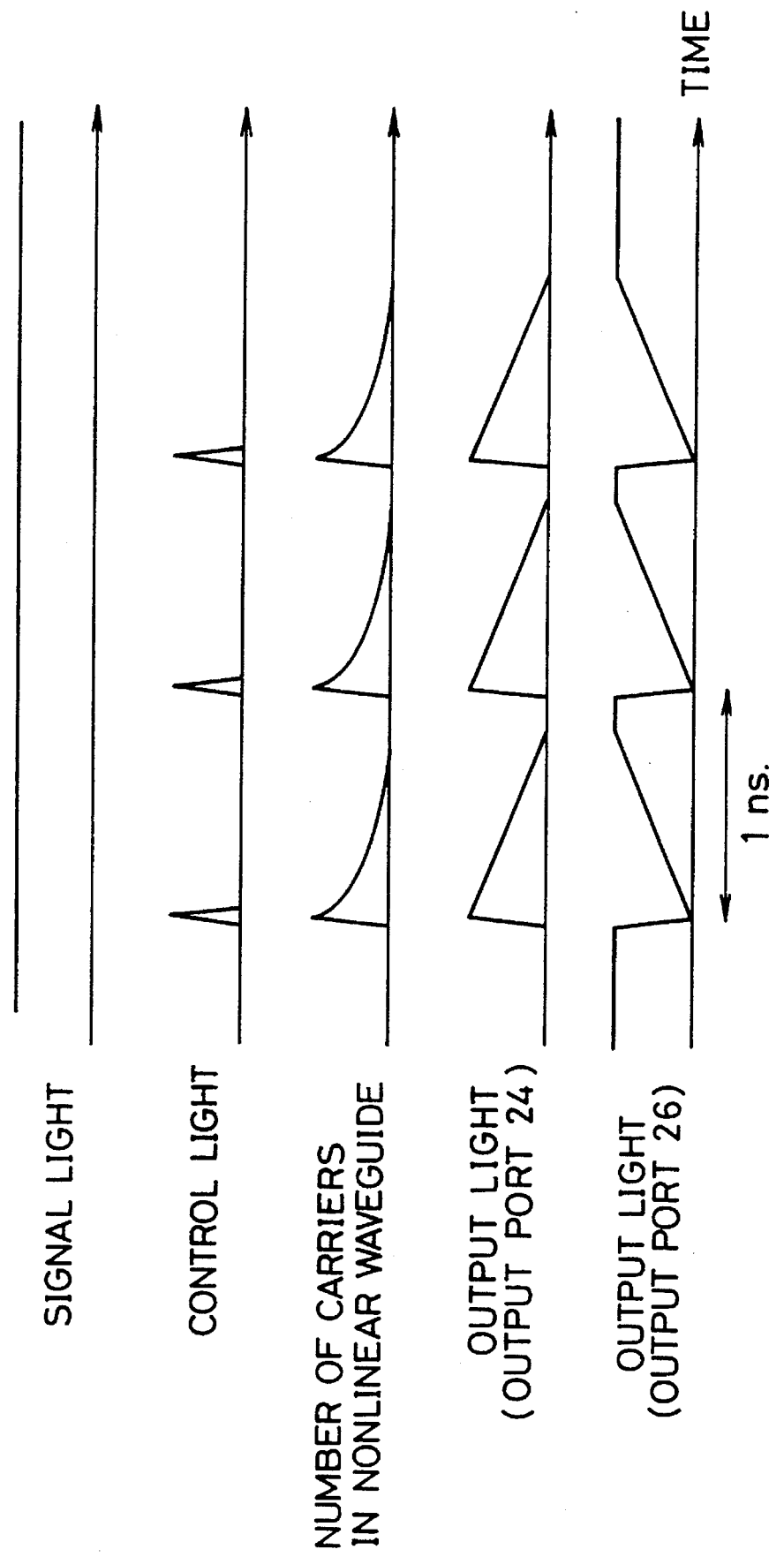
FIG. 2 illustrates waveforms of various lights and a change in a number of carriers in the conventional Mach-Zehnder type all-optical device illustrated in FIG. 1.

FIG. 2 schematically illustrates how each portion of the all-optical device 1 illustrated in FIG. 1 varies with an axis of abscissa indicating time. For simplifying the explanation, it is assumed that a signal light transmitted through the input port 20 and having a wavelength of 900 nm has a constant intensity as illustrated in FIG. 2. The lengths of the arms 28 and 30 in the case of absence of nonlinear refractive index change due to a control light is determined so that the signal light all leaves the all-optical device 1 through the output port 26. A control light has a wavelength of 865 nanometers (nm), a pulse width of 10 picoseconds (pc), and a repetition frequency of 1 gigahertz (GHz). The control light is introduced into the nonlinear waveguide 16 through the wavelength selective coupler 14 to thereby be absorbed in the nonlinear waveguide 16, and then carriers are excited as illustrated in FIG. 2 in the nonlinear material of which the nonlinear waveguide 16 is composed.

As illustrated in FIG. 2, a number of carriers rapidly increases in proportion to the absorption of a pulse of the control light, and thereafter decrease due to recombination process. The refractive index of the nonlinear material is, in rough approximation, in approximate proportion to a number of internally excited carriers. If the energy of the control light pulses is such that it can generate a number of the carriers so that the optical length of the arm 30 is changed by ½-wavelength, the optical output from the output ports 24 and 26 varies as illustrated in FIG. 2. When the carriers are rapidly excited by the control light, the refractive index of the nonlinear waveguide 16 is accordingly varied to thereby change the optical length of the arm 30. Hence, the signal light output is rapidly switched from the output port 26 to the output port 24. However, since lifetime of the excited carriers is hundreds of picoseconds, recovery of the refractive index is restricted by that. As a result, the switching waveforms have a long tail as illustrated in FIG. 2, in spite of the use of excitation light having short pulses.

Hereinbelow will be explained the preferred embodiments in accordance with the invention.

Figure 3:
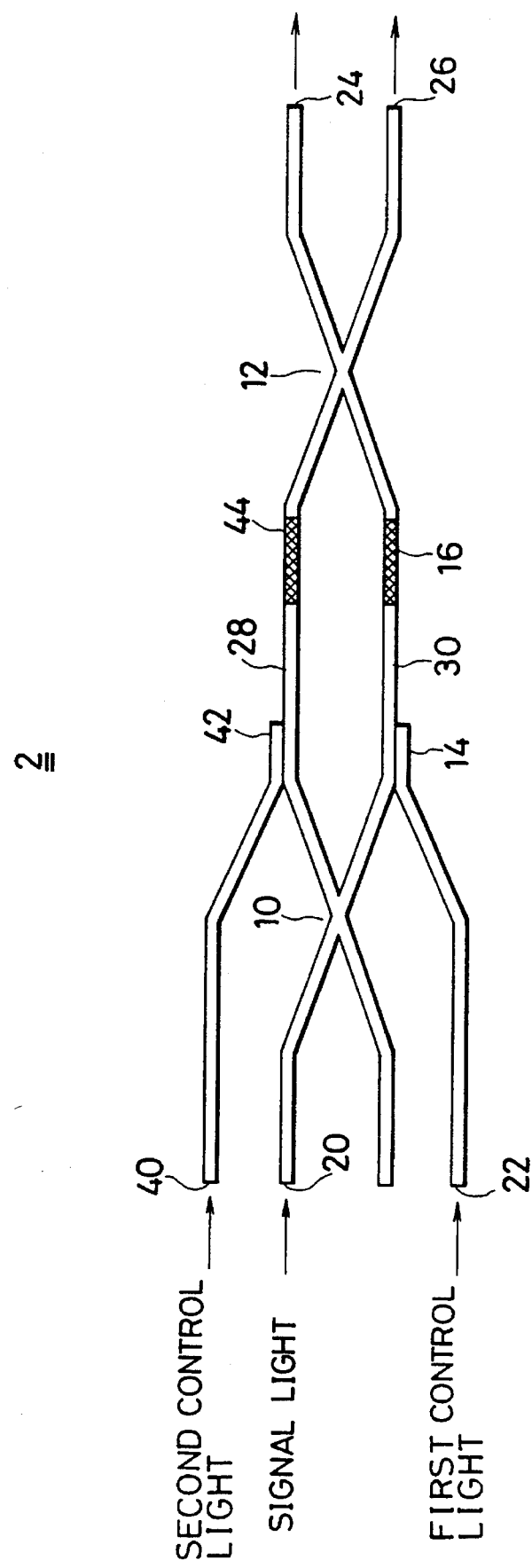
FIG. 3 is a schematic view illustrating a first embodiment of the Mach-Zehnder type all-optical device in accordance with the invention.

The invention resolves the above mentioned problem of the slow switch-off time. FIG. 3 illustrates a first embodiment of the Mach-Zehnder type all-optical device in accordance with the invention. The all-optical device 2 in accordance with the invention is different from the conventional all-optical device 1 illustrated in FIG. 1 in that the all-optical device 2 has at both of the arms 28 and 30 first and second input ports 22 and 40 through which first and second control lights are introduced into the all-optical device 2 respectively, and that the all-optical device 2 is symmetrical with respect to top and bottom thereof. More specifically, the all-optical device 2 includes an additional input port 40 through which a second control light is introduced into the all-optical device 2, connected to the second arm 8 through a second wavelength selective coupler 42, and a nonlinear waveguide 44 disposed in the second arm 28.

Figure 4:
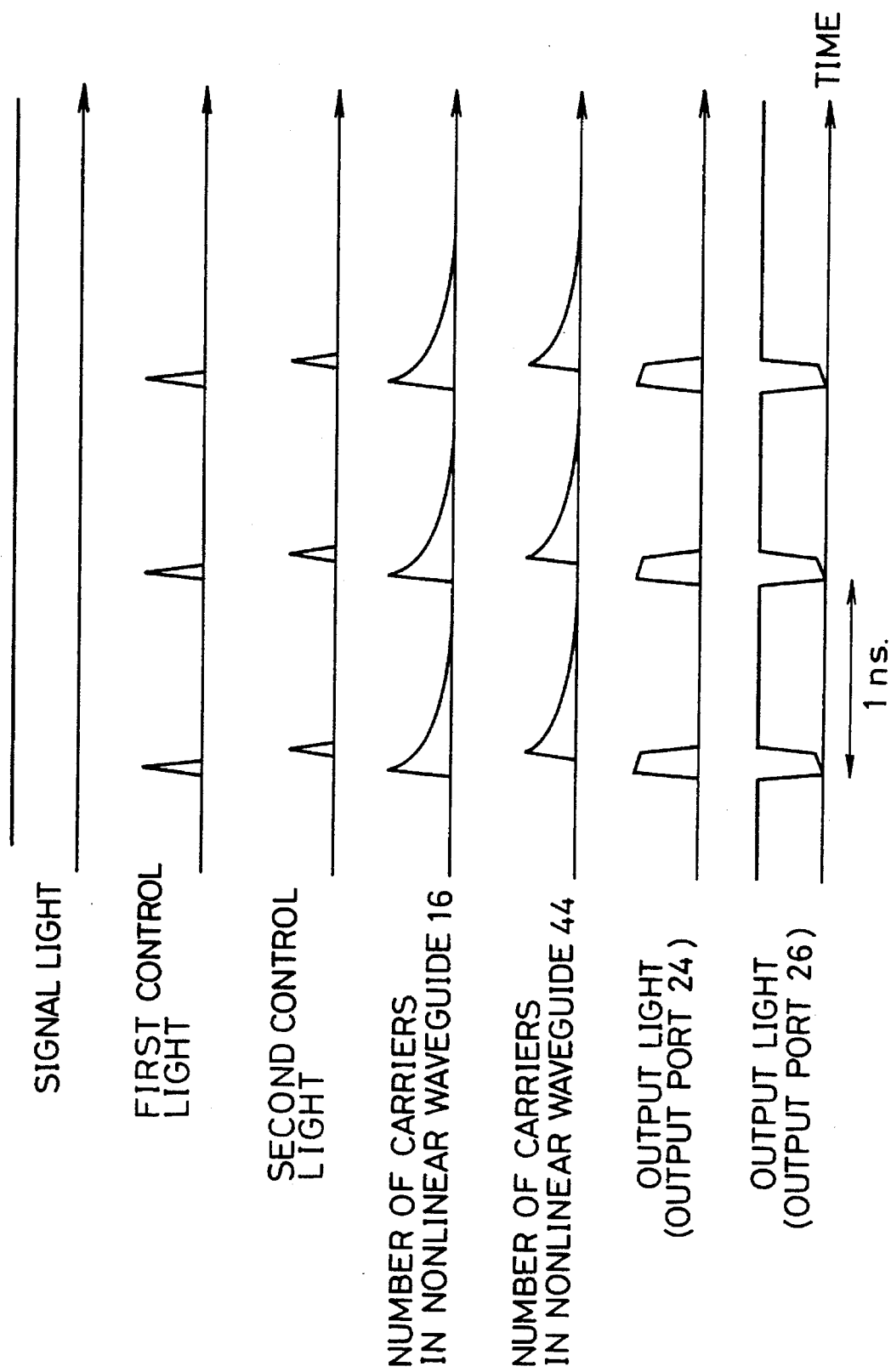
FIG. 4 illustrates waveforms of various lights and changes in a number of carriers in the Mach-Zehnder type all-optical device illustrated in FIG. 3.

FIG. 4 illustrates how each elements of the all-optical device 2 change as times go by. A signal light remains having a constant intensity similarly to the case of FIG. 2.

A first control light operates similarly to the conventional control light illustrated in FIGS. 1 and 2, and varies the refractive index of the nonlinear waveguide 16 by optically exciting the nonlinear waveguide 16 of the first arm 30. If the second control light is not present, the first control light operates similarly to that of FIG. 2. The output rapidly varies in accordance with the optical absorption, and thereafter slowly returns to the initial state due to carrier recombination. However, in the illustrated embodiment, as illustrated in FIG. 4, the second control light excites the second arm 28 when 50 picoseconds has passed after the excitation by the first control light. The pulse energy of the second control light is such that the pulse energy excites carriers remaining in the nonlinear waveguide 16 at the moment when the second control light excites the nonlinear waveguide 44. This means that the second control light has weaker energy than the first control light. Accordingly, at the moment when the second control light excites the nonlinear waveguide 44, the effective length of the second arm 28 becomes identical to that of the first arm 30. Consequently, as illustrated in FIG. 4, the output light transmitted through the port 24 rapidly rises up when the first control light excites the carriers in the nonlinear waveguide 16 (switch-on), and rapidly falls down or returns to the original situation when the second control light excites the carriers in the nonlinear waveguide 44 (switch-off). As a result, the switching speed of the all-optical device is not dependent on the relaxation time of the nonlinear material.

The foregoing can be proved by the following simple calculations. Assumptions made in the calculations are as follows.

(a) The control pulses are $\text{sech}^2$-shaped.

(b) The number N of photocarriers generated in a core of the nonlinear waveguide obeys a simple rate equation as follows:

$$dN/dt = G - N/\tau$$

wherein G denotes the carrier generation rate, and $\tau$ denotes the carrier life time.

(c) An all-optical device is an ideal Mach-Zehnder type all-optical device.

$$I_{out} = \frac{1}{2} \sin(\Delta\phi - \pi/2) + \frac{1}{2}$$

wherein $\Delta\phi$ denotes the nonlinear phase-shift.

(d) The nonlinear refractive index change is proportional to the number of carriers.

(e) Linear and nonlinear absorptions are negligibly small.

The operation conditions are as follows:

(a) The control pulses width is 1 ps (FWHM).

(b) The relaxation speed of the nonlinear refractive index change is 1 ns.

(c) The switching speed or time interval between the first and second pulses is 10 ps.

Figure 5:
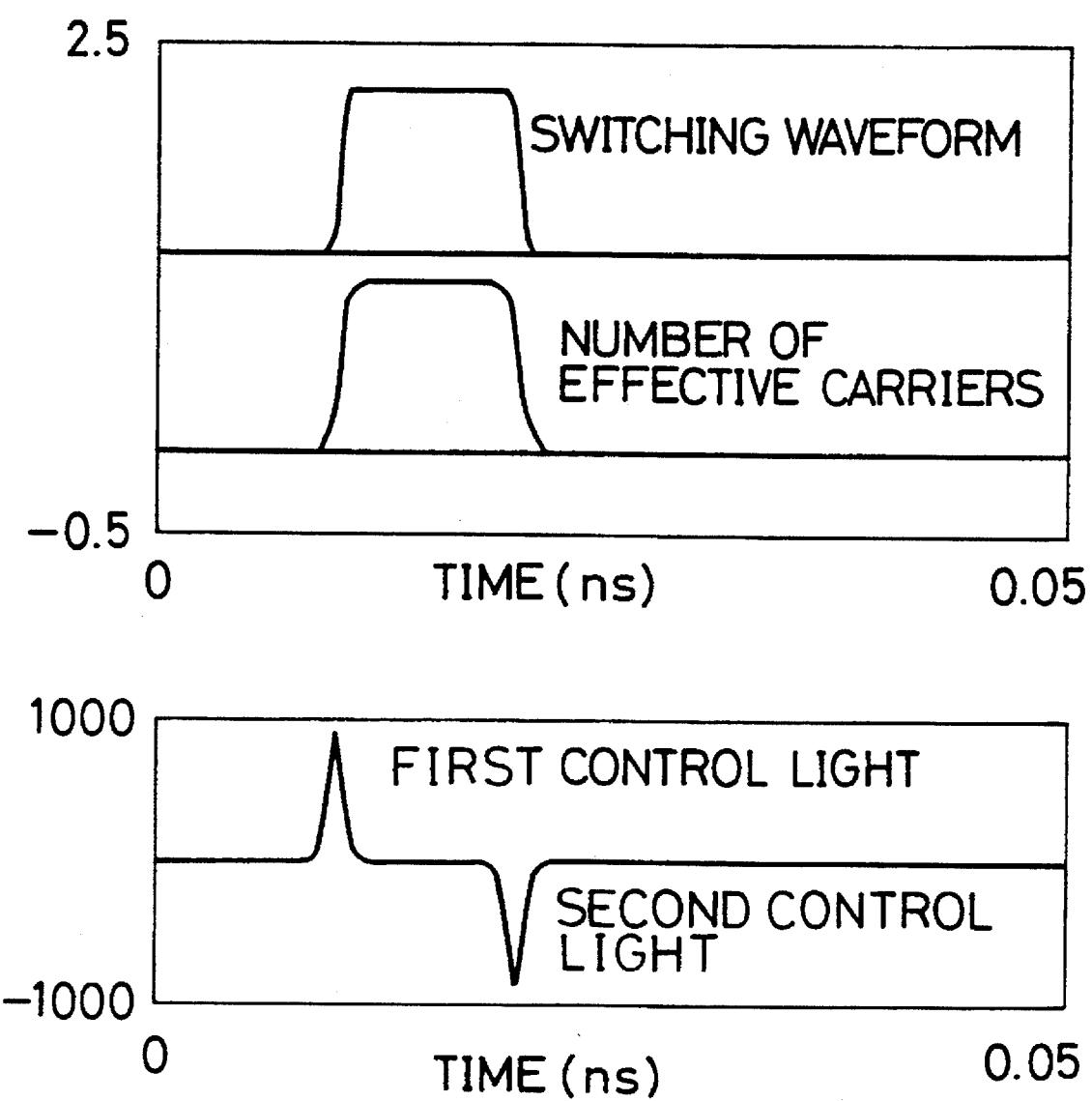
FIG. 5 illustrates the results of simulating the operation of the all-optical device in accordance with the invention.

(d) The pulse energy of the second control light =0.99×the pulse energy of the first control light The results of calculation is shown in FIG. 5, in which the values are appropriately normalized. In FIG. 5, the second control light is illustrated as a negative pulse for emphasizing that the second control light causes the al I-optical device to be switched-off. The number of effective carriers in FIG. 5 means a number subtracting a number of carriers in the semiconductor nonlinear waveguide 44 from a number of carriers in the semiconductor nonlinear waveguide 16, and is preferable to be zero after switching similarly to the switching waveform. Thus, it can be understood that the second control pulse can entirely cancel the slow nonlinear refractive index change generated due to the first control pulse. Since it is assumed that the relaxation speed of the nonlinear refractive index change is 1 ns, a difference in energy between the pulses is negligibly small. However, if the relaxation speed is increased by whatever means, it is necessary to establish the appropriate relationship between the pulse energies for obtaining the improved switching characteristics.

In the all-optical switch, switch-off as well as switch-on is dependent on ultra-fast optical absorption in principle of the operation. Thus, the switching waveform entirely follow the excitation pulse, and further the use of pulses shorter than the switching speed enables to obtain square switching waveform (digital switching waveform) as can be seen in FIG. 5. Thus, the switching speed is not dependent on the relaxation in the nonlinear refractive index change, but is dependent on the time difference between the first and second control pulses, and hence, if such ultra-short pulses can be established, the switching speed corresponding to such pulses can be obtained.

Figure 6:
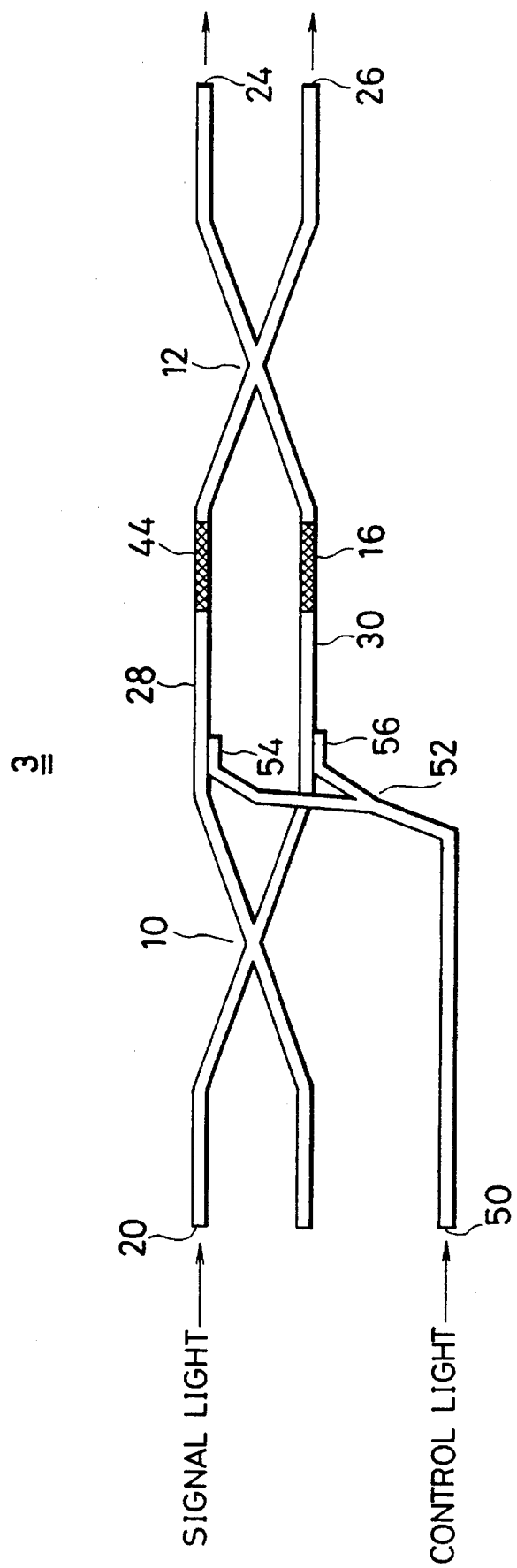
FIG. 6 is a schematic view illustrating a second embodiment of the Mach-Zehnder type all-optical device in accordance with the invention.

In the above mentioned embodiment, there are disposed a plurality of input ports through which the control lights are transmitted into the all-optical device. However, in a practical sense, it is preferable to introduce a single control light through an input port and then split the control light in the all-optical device. An example embodied in such a way is illustrated in FIG. 6 as a second embodiment. In an all-optical device 3 in accordance with the second embodiment, a control light introduced through a single input port 50 is approximately bisected by a 3 dB coupler 52, and then the thus split control lights are transmitted to the first and second arms 30 and 28 through first and second wavelength selective couplers 56 and 54, respectively. The switching speed is dependent on a difference in optical length between optical length from a 3 dB coupler 52 to the nonlinear waveguide 44 and optical length from the 3 dB coupler 52 to the nonlinear waveguide passage 16. As is clearly understood from FIG. 6, the nonlinear waveguide 16 is first excited. However, attention should be paid to the following. The coupler 52 is not an exact 3 dB coupler, but is arranged to ensure that pulse energy is assigned to the second arm 28 for generating carriers remaining in the nonlinear waveguide 16 at the moment when the nonlinear waveguide 44 is excited.

As explained hereinabove, the all-optical device in accordance with the invention excites the nonlinear waveguides in the arms with a time difference, to thereby establish ultra-high-speed switching not dependent on the relaxation time of nonlinearity.

Figure 7:
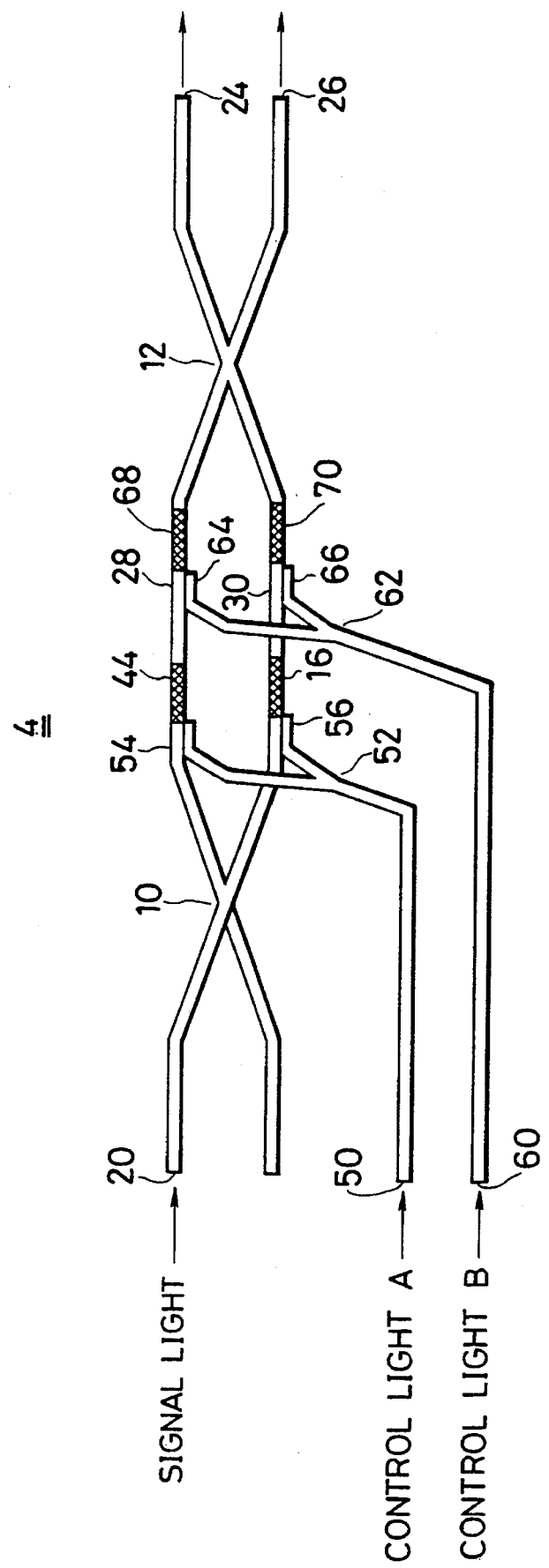
FIG. 7 is a schematic view illustrating a third embodiment of the Mach-Zehnder type all-optical device in accordance with the invention.

Next, the improvement of switching frequency is explained hereinbelow. FIG. 7 illustrates a third embodiment of the all-optical device in accordance with the invention, by which a problem of operation frequency is partially resolved. The all-optical device 4 illustrated in FIG. 7 has the same parts as the device illustrated in FIG. 6 except that the illustrated device has two input ports 50 and 60 through which control lights are to be transmitted. The operation of the input ports 50 and 60 is independent from each other because they are dependent on different nonlinear waveguides. Accordingly, it is possible to achieve doubled operation frequency by operating the input ports 50 and 60 with excitation light pulses having different phases but the same frequency. The illustrated embodiment has two sets of input ports, however, it is possible to achieve ten times the operation speed by arranging ten sets of input ports. In addition, the same effects as aforementioned can be obtained by appropriately arranging the saturation characteristics of the nonlinear waveguides. The example is shown in FIGS. 8 and 9.

Figure 8:
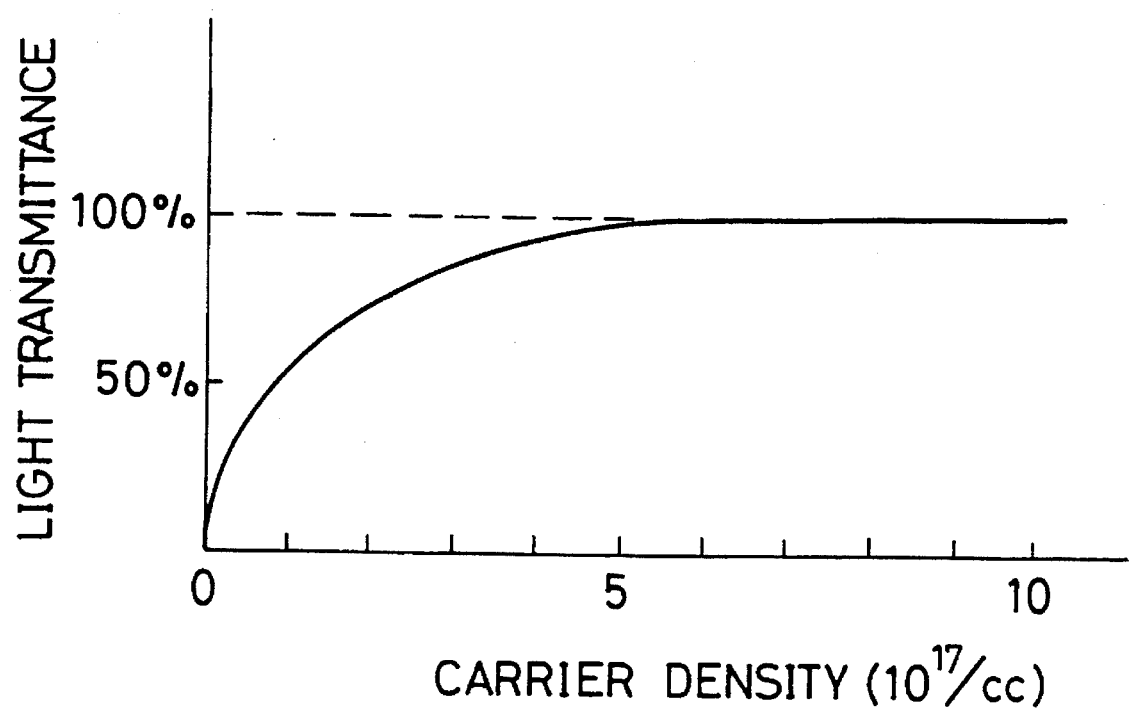
FIG. 8 is a graph illustrating a desired saturation characteristics of nonlinear material for the ultra-high repetition operation of the all-optical device in accordance with the invention.

FIG. 8 shows a general relationship in a semiconductor of which the nonlinear waveguide is composed, between the density of photocarriers generated by a control light having excitation resonant wavelength, and the light transmittance at the same wavelength. In the embodiment, the semiconductor is a quantum well of GaAs or GaAs/AlGaAs. The light absorption decreases as the density of carriers present in the semiconductor increases, and reaches almost zero (0) when the carrier density reaches approximate $6 \times 10^{17}$ /cc. This is a phenomenon in which the absorption coefficient is reduced as the intensity of the control light increases, and is called absorption saturation. Accordingly, in the event that the nonlinear waveguide is constructed from a semiconductor as aforementioned and its core is optically excited starting from an end thereof, the distribution of the carrier density along the nonlinear waveguide is much influenced by the above mentioned absorption saturation characteristics.

FIG. 9 shows the situation of how the distribution is influenced is by the absorption saturation. FIG. 9 schematically illustrates the distribution of photocarriers in the event that the semiconductor waveguide is optically excited under the conditions as mentioned above. Each rectangle denotes the same semiconductor waveguide. Here, for the sake of simplification, it is assumed that the rectangle has three sections A, B and C. Time is denoted by a small letter "t". The situations are depicted correspondingly to each time. As is depicted in FIG. 9 at the top, the semiconductor waveguide is not still optically excited at t=0. At t=1, the waveguide is optically excited at the left end thereof, and thus the section A is first absorption-saturated. In FIG. 9, the absorption-saturated section(s) is(are) denoted with hatching. At t=2, a next control pulse excites the waveguide passage from the left. As is illustrated in the second row in FIG. 9, since the section A has already been absorption-saturated, the control pulse passes through the section A and then is absorbed in the section B to thereby bleach the section B. Thus, the section B is absorption-saturated.

At t=3, a next control pulse comes into the waveguide. Since the sections A and B have been already absorption-saturated, the control pulse is absorbed in the section C to thereby bleach the section C. Hereinbelow, it is assumed that a photocarrier has the lifetime of 2.5 in the semiconductor on the same time unit as that of "t". In FIG. 9, time t' denotes a time having passed after each section has been optically excited. At t=3, the all sections A, B and C have been bleached, but a time interval t'=2 has already passed after the section A has been absorption-saturated. Accordingly, the section A recovers from the absorption-saturation before a next control pulse reaches the section A at t=4. The waveguides shown on the right column in FIG. 9 indicates that the waveguide has a section or sections recovering from the absorption-saturation At t=4, a next pulse comes into the waveguide. At this time, since the section A recovers from the absorption-saturation, the control pulse is absorbed in the section A to thereby bleach the section A again. Also at this time, since a time interval t'=2 has already passed after the section B has been absorption-saturated, the section B recovers from the absorption-saturation before a next control pulse reaches the waveguide, as is illustrated at the second row on the right column. Accordingly, at t=5, the section B absorbs the control pulse and hence is absorption-saturated.

Next, the section C recovers from the absorption-saturation since a time interval t'=2 has already passed after the section C has been absorption-saturated, and is bleached again at t=6. As aforementioned, by appropriately arranging the absorption saturation characteristics of the nonlinear waveguide, it is possible to absorption-saturate spatially different sections in the waveguide in turn. Thus, even when the repetition frequency of the control pulse is faster than an inverse of the relaxation time or carrier lifetime of the nonlinear waveguide, it is possible to respond to the control pulse. An all-optical device capable of achieving the foregoing is equivalent to one which has a plurality of portions having nonlinearity and in which such portions are in turn excited. Such an all-optical device is in principle similar to the all-optical device illustrated in FIG. 7, however, is considered to be a perfect device with respect to the operation because it has only a single input port through which the control light is transmitted to the nonlinear waveguide.

Hereinabove have been explained so far about an all-optical device in which the switching speed is not restricted by the relaxation time of the nonlinear material. However, it should be noted that the scope of the invention is not limited to the aforementioned embodiments. In the embodiments, the description has been made with reference to the nonlinear refractive index change caused by real carrier generation of photocarriers in GaAs, however, the invention is applicable to semiconductors such as InP and InGaAsP, organic material and other materials. The mechanism for the nonlinear refractive index change is not limited to the above mentioned carrier generation (band-filling). If electrons and holes are electrically injected into the semiconductor waveguide, like the case of semiconductor laser amplifier, similarly efficient, but slow nonlinearity occurs by stimulated emission caused by the control light. This and other efficient, but slow nonlinearities are equally suitable to the present invention. In addition, the embodiments have been limited, for the sake of simplifying the explanation, to the arrangement in which elements other than the nonlinear waveguide passage are composed of optical fibers, but it is also possible that the all-optical device be composed of semiconductors. Furthermore, though the Mach-Zehnder circuit is composed of a pair of 3 7573 dB couplers in the embodiments, the Mach-Zehnder circuit may be composed of Y-shaped optical circuit for splitting a beam or joining together split beams. The wavelength selective coupler can have any forms if it has satisfactory functions.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A Mach-Zehnder type all-optical device for controlling a signal light with a control light, comprising:

first and second arms for constituting a Mach-Zehnder configuration, each of said arms having at least a portion thereof composed of nonlinear material having third order optical nonlinearity characteristics;

first means introducing a first control light to said nonlinear portion of said first arm; and second means introducing a second control light, which has a time difference from said first control light, to said nonlinear portion of said second arm.

2. A Mach-Zehnder type all-optical device in accordance with claim 1, wherein the optical nonlinearity of said arms being approximately identical with each other.

3. A Mach-Zehnder type all-optical device in accordance with claim 1 further comprising means for splitting a control light into two beams and introducing said beams to said nonlinear portions of said arms.

4. A Mach-Zehnder type all-optical device in accordance with claim 3, wherein there is a time gap between the introduction of each of said two beams, wherein the time gap is shorter than the relaxation time of said optical nonlinearity.

5. A Mach-Zehnder type all-optical device for controlling a signal light with a control light, comprising:

first and second arms for constituting a Mach-Zehnder configuration, each of said arms having at least a portion thereof composed of nonlinear material having absorption saturation characteristics and nonlinear refractive index change associated therewith;

first means introducing a first control light to said nonlinear portion of said first arm; and second means introducing a second control light, which has a time difference from said first control light, to said nonlinear portion of said second arm.

6. A Mach-Zehnder type all-optical device for controlling a signal light with a control light, comprising:

two arms for constituting a Mach-Zehnder configuration, each of said arms having a plurality of portions composed of nonlinear material having third order optical nonlinearity characteristics;

means for introducing a control light to each of said plurality of portions.

7. A Mach-Zehnder type all-optical device in accordance with claim 6, wherein the optical nonlinearity of said arms being approximately identical with each other.

8. A Mach-Zehnder type all-optical device in accordance with claim 6 further comprising means for splitting a control light into two beams and introducing said beam to said plurality of portions.

9. A Mach-Zehnder type all-optical device in accordance with claim 8, wherein there is a time gap between the introduction of said two beams, wherein the time gap is shorter than the time of said optical nonlinearity.

10. A Mach-Zehnder type all-optical device for controlling a signal light with a control light, comprising:

two arms for constituting a Mach-Zehnder configuration, each of said arms having a plurality of portions composed of nonlinear material having absorption saturation characteristics and nonlinear refractive index change associated therewith; and means for introducing a control light to each of said plurality of portions.

11. A Mach-Zehnder type all-optical device for controlling a signal light with a control light, comprising;

two arms constituting a Mach-Zehnder configuration, each of said arms having at least a portion composed of nonlinear material; and means for introducing a control light to each nonlineaar portion of each arm, wherein a time gap exists between the introduction of the control light to each of said arms.

12. A Mach-Zehnder type all-optical device for controlling a signal light with a control light, comprising:

two arms for constituting a Mach-Zehnder configuration, each of said arms having at least a portion thereof composed of nonlinear material having third order optical nonlinearity characteristics; and means introducing a control light to said nonlinear portion of each said arm; and means splitting a control light into two beams and introducing said beams to said nonlinear portions of said arms wherein there is a time gap between the introduction of each of said two beams, wherein the time gap is shorter than the relaxation time of said optical nonlinearity.

* * * * *